United States Patent
Fukuma et al.

(10) Patent No.: US 6,428,301 B1
(45) Date of Patent: Aug. 6, 2002

(54) LENS MOLDING APPARATUS AND LENS MOLDING TOOL

(75) Inventors: Yasufumi Fukuma; Takeyuki Kato, both of Tokyo (JP)

(73) Assignee: Kabushiki Kaisha Topcon, Tokyo (JP)

(*) Notice: Subject to any disclaimer, the term of this patent is extended or adjusted under 35 U.S.C. 154(b) by 0 days.

(21) Appl. No.: 09/212,561

(22) Filed: Dec. 16, 1998

(30) Foreign Application Priority Data

Dec. 17, 1997 (JP) .............................. 9-348000

(51) Int. Cl.[7] .............................................. B29C 33/06
(52) U.S. Cl. ...................... 425/141; 264/1.38; 425/169; 425/174.4; 425/808
(58) Field of Search ................................ 425/140, 141, 425/808, 174.4, 169, 174; 264/1.36, 1.37, 1.38, 408, 1.1, 409; 249/117, 160

(56) References Cited

U.S. PATENT DOCUMENTS

| | | | | |
|---|---|---|---|---|
| 3,676,033 A | * | 7/1972 | Buonaiuto ................. 425/174 |
| 4,008,031 A | * | 2/1977 | Weber ..................... 425/242 R |
| 4,440,699 A | * | 4/1984 | Smid et al. ................. 264/1.4 |
| 4,524,419 A | * | 6/1985 | Headlund et al. ........... 364/474 |
| 5,288,221 A | * | 2/1994 | Stoerr et al. ................ 425/125 |
| 5,379,111 A | * | 1/1995 | Kajino et al. ................ 356/124 |
| 5,469,261 A | * | 11/1995 | Hellmuth et al. ............ 356/361 |
| 5,549,885 A | * | 8/1996 | Nakanishi et al. ........... 264/2.5 |
| 5,553,052 A | * | 9/1996 | Oono et al. ................. 369/112 |
| 5,719,668 A | * | 2/1998 | Oana et al. ................. 356/124 |
| 5,792,392 A | * | 8/1998 | Maus et al. ................. 264/2.5 |
| 5,861,114 A | * | 1/1999 | Roffman et al. ............. 264/2.5 |
| 5,882,698 A | * | 3/1999 | Su et al. ..................... 425/215 |
| 5,971,537 A | * | 10/1999 | Fukuma et al. .............. 351/44 |
| 5,999,251 A | * | 12/1999 | Teramoto et al. ............ 356/127 |
| 6,003,339 A | * | 12/1999 | Morikita ..................... 65/275 |
| 6,042,754 A | * | 3/2000 | Yang et al. .................. 264/1.1 |

* cited by examiner

Primary Examiner—Tim Heitbrink
Assistant Examiner—Emmanuel Luk
(74) Attorney, Agent, or Firm—Finnegan, Henderson, Farabow, Garrett and Dunner, L.L.P.

(57) ABSTRACT

A lens molding apparatus basically includes a lens molding tool in which a pair of lens forming molds for forming outer shapes of both surfaces of a molded lens are oppositely arranged on both sides of an annular forming frame in the thickness direction to form a target space therebetween, and a molding resin is injected in the target space to form an unhardened molded lens, wherein the unhardened molded lens is hardened by irradiating the unhardened molded lens with ultraviolet rays, to form a hardened molded lens. This lens molding apparatus is characterized in that optical characteristics of the unhardened molded lens are measured by a measuring system.

8 Claims, 8 Drawing Sheets

LENS MOLDING APPARATUS AND LENS MOLDING TOOL

BACKGROUND OF THE INVENTION

1. Filed of the Invention

The present invention relates to a lens molding apparatus used for forming a molded lens by preparing an annular forming frame having on its inner peripheral surface an annular stepped portion, oppositely abutting, on the annular stepped portion, a pair of lens forming molds for forming outer shapes of both surfaces of a molded lens to be manufactured, injecting a molding resin in a space between the opposed lens forming molds, and irradiating the molding resin with ultraviolet rays to harden the molding resin; and to a lens molding tool used for the lens molding apparatus.

2. Description of the Related Art

Conventionally, a lens molding tool 1 shown in FIG. 1 has been known. The lens molding tool 1 has a silicon made annular forming frame 2 having on its inner peripheral side an annular stepped portion 3 for specifying the thickness of a molded lens. Glass made lens forming molds 5 and 6 for forming outer shapes of both surfaces of a molded lens are abutted, oppositely in the thickness direction, on the annular stepped portion 3, to form a target space 7. The forming frame 2, which is slightly deformable, is partly turned over to form a clearance between the lens forming mold 5 and the forming frame 2, and a molding resin 8 is injected in the target space 7 through the clearance between the lens forming mold 5 and the forming frame 2.

The lens molding tool 1 into which the molding resin 8 has been injected is set on a lens molding apparatus, and the molding resin 8 is hardened by irradiating the molding resin 8 with ultraviolet rays, to form a hardened molded lens.

The related art lens molding tool 1, however, has a problem. If the lens forming molds 5 and 6 are tilted to the forming frame 2, there may be produced a prism component in the molded lens hardened by irradiating the molding resin 8 with ultraviolet rays.

Another problem of the related art lens molding tool 1 lies in variations in thickness of molded lenses as finished products. As described above, the related art lens molding tool 1 has a structure in which part of the forming frame 2 is turned over to form a clearance; the molding resin 8 is injected in the target space 7 through the clearance; and the clearance is blocked by pressing the lens forming mold 5 to the annular stepped portion 3 before irradiation of the molding resin 8 with ultraviolet rays. Accordingly, in the structure of the related art lens molding tool 1, a clearance is liable to be formed between the lens forming mold 5 and the annular stepped portion 3. The related art structure is also inconvenient in that the lens forming molds 5 and 6 tend to be tilted to the forming frame 2 because the lens forming molds 5 and 6 are set on the forming frame 2 only by abutting the lens forming molds 5 and 6 on the annular stepped portion 3, and that although the lens forming molds 5 and 6 are pressed on the annular stepped portion 3 after injection of the molding resin 8 in the target space 7, there is such a possibility, on the basis of any reason, that a clearance is formed between the lens forming mold 5 and the annular stepped portion 3 or the annular stepped portion 3 is distorted when being pressed by the lens forming mold 5. In each case, a gap between the lens forming molds 5 and 6 may largely offset from a reference gap specified based on the thickness of the annular stepped portion 3, resulting in variations in thickness of molded lenses as finished products.

It is undesirable that a prism component be carelessly contained in a molded lens used for a spectacle lens, and that a thickness of the molded lens be largely varied over a tolerance. For these reasons, there have been strong demands to develop a lens molding apparatus capable of simply manufacturing molded lenses while preventing a prism component from being carelessly contained in the molded lens and suppressing variations in thickness of the molded lenses as much as possible, and a lens molding tool used for the lens molding apparatus.

SUMMARY OF THE INVENTION

An object of the present invention is to provide a lens molding apparatus capable of measuring optical characteristics of a molded lens in a state being before irradiation of a molding resin of the molded lens with ultraviolet rays, that is, in a state in which the molded lens is unhardened.

Another object of the present invention is to provide a lens molding apparatus capable of suppressing variations in thickness of molded lenses as much as possible and a lens molding tool used for the lens molding apparatus.

To achieve the above object, according to a first aspect of the present invention, there is provided a lens molding apparatus basically including a lens molding tool in which a molding resin is injected in a space formed by opposed lens forming molds to form an unhardened molded lens, wherein the unhardened molded lens is hardened by irradiating the unhardened molded lens with ultraviolet rays. The above lens molding apparatus is characterized by including a measuring system for measuring optical characteristics of the hardened molded lens.

In the lens molding apparatus according to the first aspect of the present invention, since optical characteristics of a molded lens are estimated using the measuring system directly after hardening the molded lens, it is possible to check, before the subsequent lens coating step, an inconvenience of the hardened molded lens due to erroneous selection of the forming frame.

According to a second aspect of the present invention, there is provided a lens molding apparatus basically including a lens molding tool in which a molding resin is injected in a space formed by opposed lens forming molds to form an unhardened molded lens, wherein the unhardened molded lens is hardened by irradiating the unhardened molded lens with ultraviolet rays. The above lens molding apparatus is characterized by including a measuring system for measuring optical characteristics of the unhardened molded lens.

In the lens molding apparatus according to the second aspect of the present invention, optical characteristics such as refractivity, cylindricity, axial angle, and prism component, of a molded lens as a finished product can be estimated before hardening of the molding resin.

According to a third aspect of the present invention, there is provided a lens molding tool including: an annular forming frame; a pair of lens forming molds for forming outer shapes of both surfaces of a molded lens, the forming molds being oppositely arranged on both sides of the forming frame in the thickness direction to form a target space into which a molding resin is to be injected; and a pressing jig for pressing the pair of lens forming molds.

In the lens molding tool according to the third aspect of the present invention, since the molding resin can be hardened by irradiating the molding resin with ultraviolet rays in a state in which the pair of lens forming molds are pressed by the pressing jig, it is possible to reduce variations in thickness of molded lenses as finished products.

BRIEF DESCRIPTION OF THE DRAWINGS

The above and other objects, features and advantages of the present invention will become more apparent from the following description taken in connection with the accompanying drawings, in which:

FIGS. 6(a) to 6(d) are diagrams each illustrating light points formed on a light receiving element, wherein FIG. 6(a) shows light points formed on the plane of the light receiving element when no lens forming tool is set on a set table; FIG. 6(b) shows light points formed on the plane of the light receiving element when a lens molding tool for manufacturing a convex molded lens is set on the set table; FIG. 6(c) shows light points formed on the plane of the light receiving element when a lens molding tool for manufacturing a concave molded lens is set on the set table; and FIG. 6(d) shows light points formed on the plane of the light receiving element when a prism component is contained in an unhardened molded lens formed in the lens molding tool set on the set table;

DESCRIPTION OF THE PREFERRED EMBODIMENTS

Figure 2:
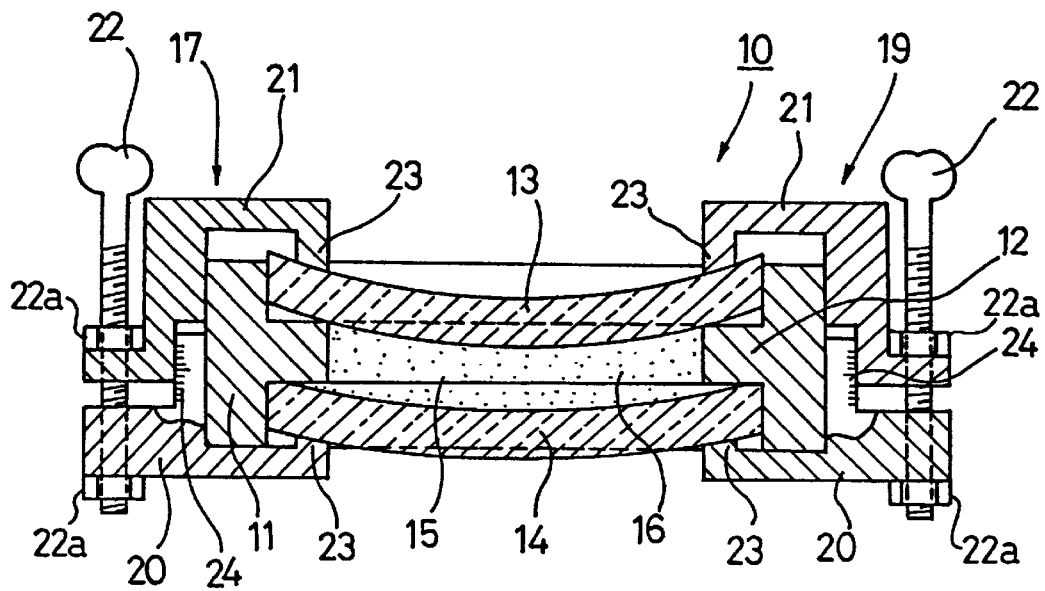
FIG. 2 is a sectional view showing one embodiment of a lens molding tool according to the present invention.
Figure 3:
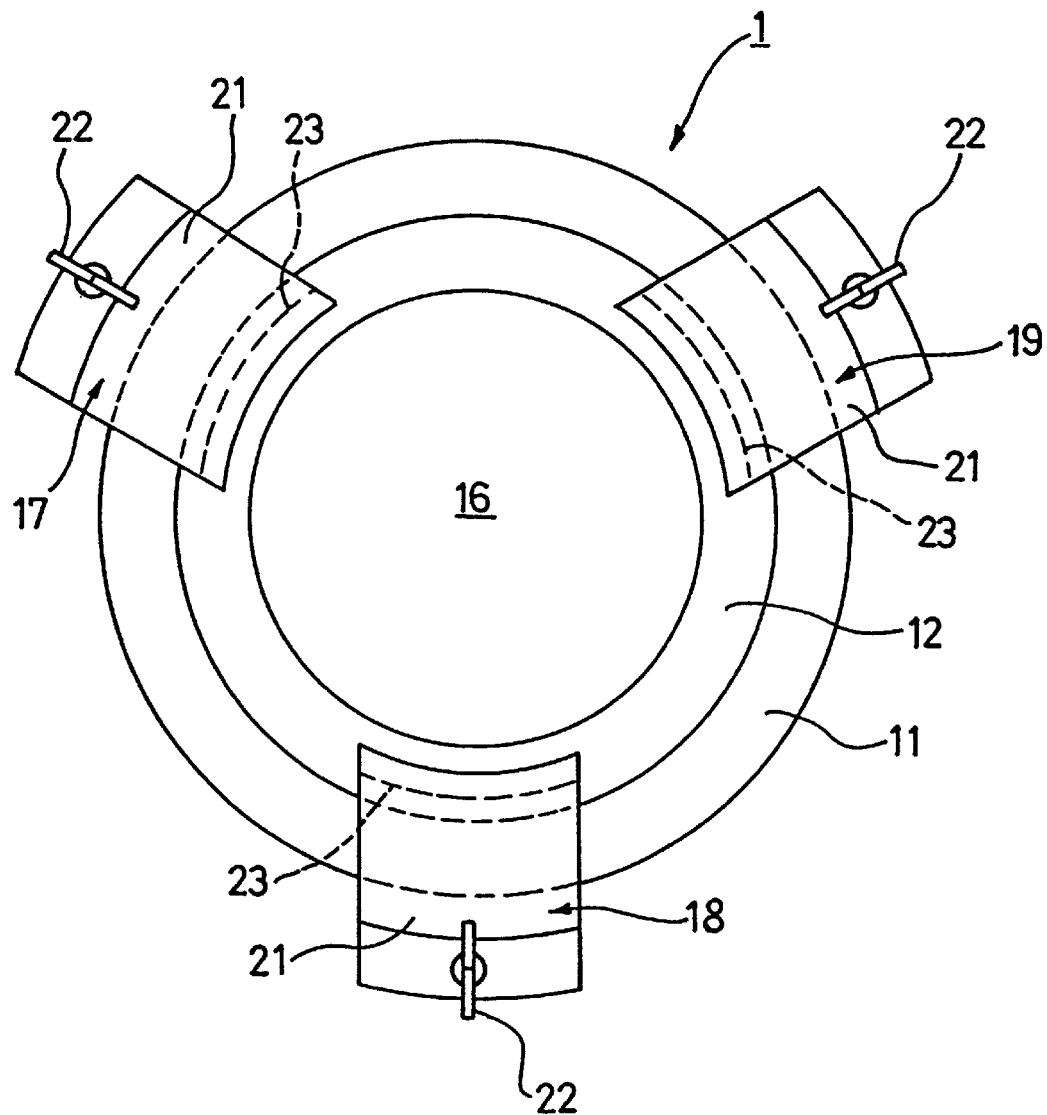
FIG. 3 is a plan view of the lens molding tool shown in FIG. 2.

Referring to FIGS. 2 and 3, reference numeral 10 designates a lens molding tool 10 having an annular forming frame(sometimes called gasket) 11 made from silicon. An annular stepped portion 12 is formed on an inner peripheral portion of the forming frame 11. A pair of disc-like lens forming molds 13 and 14 made from glass are abutted, oppositely from both the sides in the thickness direction, on both the sides of the annular stepped portion 12 in the thickness direction. Between these lens forming molds 13 and 14 is formed a target space 16 which is to be filled with a molding resin 15. The annular stepped portion 12 has a function of specifying a gap between the lens forming molds 13 and 14, that is, a thickness of a molded lens to be described later. The annular stepped portion 12 is finely deformable due to a pressing force applied by pressing jigs to be described later, so that the gap between the lens forming molds 13 and 14 is made variable.

With respect to each of the forming frame 11 and the lens forming molds 13 and 14, a plurality of kinds are prepared for each of molded lenses to be manufactured. To be more specific, in the case of the forming frame 11, there are prepared a plurality of kinds different in inside diameter (or inside diameter and outside diameter) and thickness of the annular stepped portion 12. In the case of each of the lens forming molds 13 and 14, there are prepared a plurality of kinds different in outside diameter corresponding to the inside diameter of each kind of forming frame 11, shape of the surface (specifically, the radius of curvature of the surface) matched to the outer shape of each molded lens to be manufactured, and center thickness. Then, suitable kinds of lens forming molds 13 and 14 different in radius of curvature and a suitable kind of forming frame 1 are selected in accordance with a convex or concave molded lens to be manufactured, and the lens forming molds 13 and 14 thus selected are mounted on the forming frame 11 thus selected.

Pressing jigs 17, 18 and 19 are provided on an outer peripheral portion of the forming frame 11. Each of the pressing jigs 17, 18 and 19 is basically composed of a lower pressing member 20 and an upper pressing member 21. The lower pressing member 20 is fastened to the upper pressing member 21 with a thumbscrew 22. Each of the lower pressing member 20 and the upper pressing member 21 has a pressing claw 23. The molding resin 15 is injected in the target space 16 through a clearance which is formed by turning over part of the forming frame 11 before the pressing jigs 17, 18 and 19 are mounted on the forming frame 11.

It may be desirable that at least three pieces of the pressing jigs (in this embodiment, the pressing jigs 17, 18 and 19) be arranged, as shown in FIG. 3, around the periphery of the forming frame 11 in such a manner as to be spaced from each other at equal intervals. The outer peripheral portions of the lens forming molds 13 and 14 are pressed to each other by fastening the thumbscrews 22 after the target space 16 is filled with the molding resin 15.

A scale 24 is engraved in the lower pressing member 20. An operator can adjust the pressing force of the pressing jigs 17, 18 and 19 by visually observing the scale 24. The inclination of each of the lens forming molds 13 and 14 to the forming frame 11 can be controlled by adjusting the pressing force of the pressing jigs 17, 18 and 19. In addition, symbol 22a designates a nut to be screwed around the thumbscrew 22. It should be noted that an excess of the resin in the lens forming frame 11 at the time when the pressing force is applied by the pressing jigs 17, 18 and 19 is extruded from the lens forming frame 11.

Figure 4:
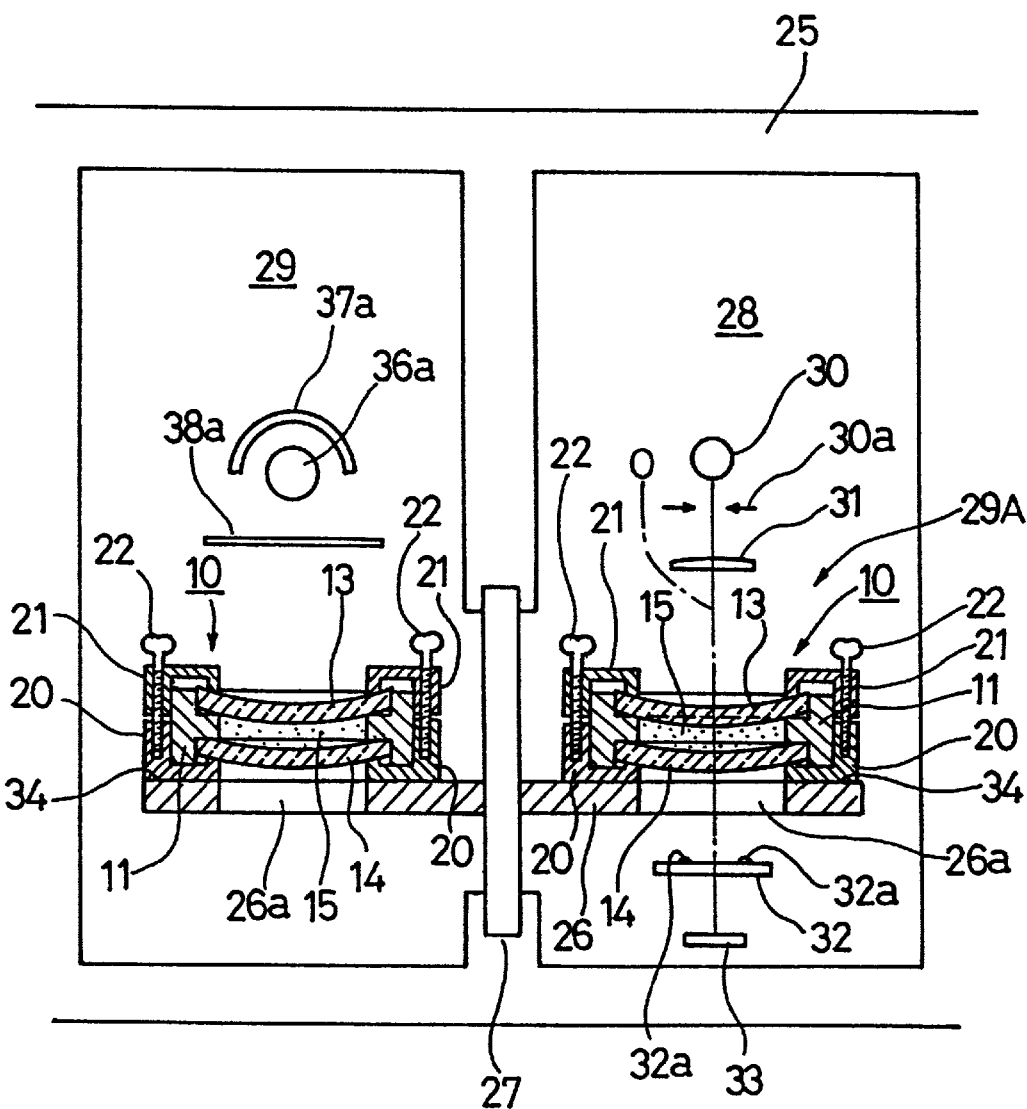
FIG. 4 is a schematic configuration view showing a first embodiment of a lens molding apparatus according to the present invention.

FIG. 4 is a schematic view of a first embodiment of a lens molding apparatus according to the present invention. The lens molding apparatus has, in a housing 25, a set table 26 for setting the lens molding tool 10. The set table 26 is configured as a rotary table which is turnable around a turning shaft 27. A transmission portion 26a, which allows measuring light rays (which will be described later) to pass therethrough, is formed in the set table 26.

The housing 25 is partitioned into an optical characteristic measuring chamber 28 for measuring optical characteristics of the molding resin 15 in an unhardened state, and an ultraviolet ray irradiation chamber 29 for irradiating the molding resin 15 with ultraviolet rays. The measuring chamber 28 is provided with a measuring system 29A. The measuring system 29A is basically composed of a light source 30, a pin-hole plate 30a, a collimator lens 31, a pattern plate 32, and a light receiving element 33.

Figure 1:
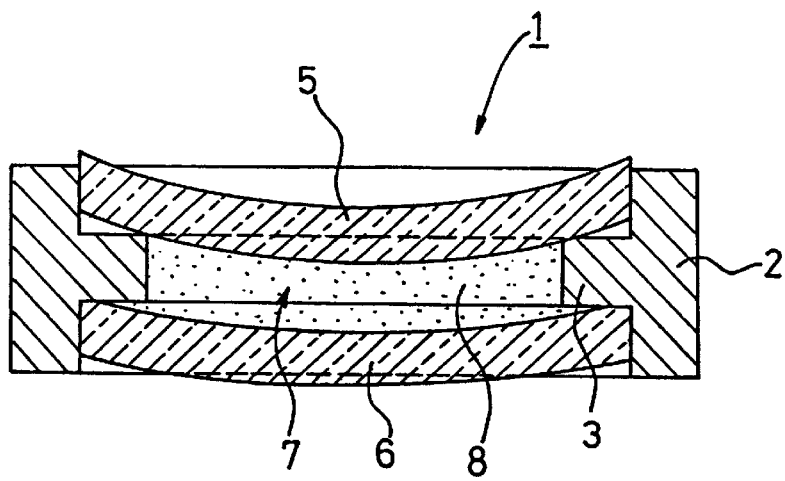
FIG. 1 is a sectional view showing a schematic configuration of a related art lens molding tool.

The rotating region of the set table 26 is located between the collimator lens 31 and the pattern plate 32. The set table 26 has circular positioning marks 34 as a positioning portion for substantially aligning the center of the forming frame 11 with the center O of the measuring optical axis. The positioning marks 34 are provided concentrically in accordance with outside diameters of a plurality of kinds of forming frames 11 (or pressing. jigs 17, 18 and 19). That is to say, in the case where the related art lens molding tool 1 shown in FIG. 1 is set on the set table 26, the circular mark corresponding to the outside diameter of the forming frame 2 is used, and when the lens molding tool 10 having the pressing jigs 17, 18 and 19 in this embodiment is set to the set table 26, a set of circular-arc marks for specifying the outer edges of the pressing jigs 17, 18 and 19 are used.

After being filled with the molding resin 15, the lens molding tool 10 is set on the set table 26 while being positioned at the positioning mark 34 as shown in FIG. 4. In addition, the structure of the pressing jigs 17, 18 and 19 shown in FIG. 4 is slightly different from that shown in FIG. 2 in that the structure shown in FIG. 4 has no scale. The reason for this is as follows: namely, the structure provided with the scales 24 shown in FIG. 2 is convenient in finely adjusting the pressing force applied to the lens forming molds 13 and 14; however, the pressing force can be adjusted even if any scale 24 is not provided, or as shown by the enlarged view of FIG. 5, the pressing force can be adjusted using a pressing mechanism 35, provided in the measuring system 29A, for pressing the lens forming molds 13 and 14 during measurement of optical characteristics.

Figure 5:
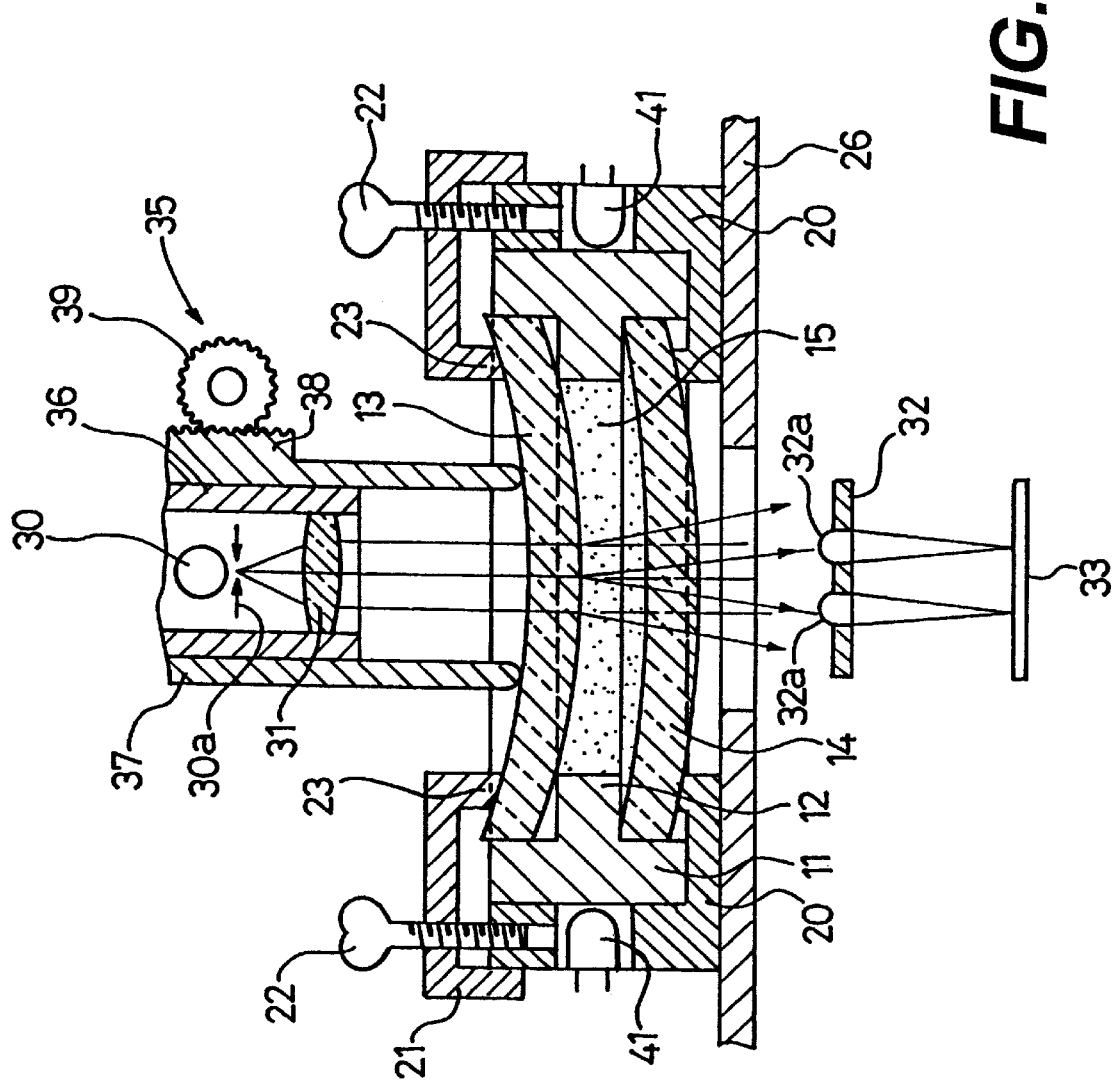
FIG. 5 is an enlarged sectional view showing one example of a concrete configuration of a measuring system according to the present invention.

In the following description, it is assumed that the lens molding tool 10 having the structure shown in FIG. 5 is set on the set table 26 shown in FIG. 4.

The measuring system 29A has a mirror cylinder 36 in which the measuring light source 30, pin-hole plate 30a, and collimator lens 31 are arranged. The pressing mechanism 35 in this embodiment includes,a pressing cylinder 37 for pressing a central portion of the lens forming mold 13. The pressing cylinder 37 is slidable in the vertical direction while being guided by the mirror cylinder 36. A rack 38 meshing with a pinion 39 is formed around the mirror 37. The pinion 39 is driven by a pulse motor (not shown), and accordingly, the pressing force applied to the lens forming molds 13 and 14 is adjusted by controlling a descended amount of the pressing cylinder 37 from a reference height.

The descended amount of the pressing cylinder 37 can be measured by counting the number of pulses of the pulse motor. Such a pressing mechanism 35 can be used as a thickness measuring means for indirectly measuring a gap between the lens forming molds 13 and 14, that is, the center thickness of the molding resin 15, thereby predicting the thickness of a molded lens after being hardened.

With the measuring system 29A having the pressing mechanism 35 shown in FIG. 5, optical characteristics of the molding resin 15 before hardening are measured in a state in which the central portions of the lens forming molds 13 and 14 are pressed. That is to say, the optical characteristics of the molded lens before being hardened are measured by the measuring system 29A under such a condition that the thickness of the molded lens before being hardened is substantially equal to that of a molded lens as a finished product. The measuring system 29A provided with the pressing mechanism 35 has a merit when it is applied to the related art lens molding tool 1.

In the case of using the lens molding tool 10 in this embodiment, the pressing mechanism 35 is not required to be provided because optical characteristics of the molding resin 15 can be measured in a state in which the lens forming molds 13 and 14 are pressed by the pressing jigs 17, 18 and 19, so that it is possible to suppress variations in thickness of molded lenses as finished products.

Figure 6A:
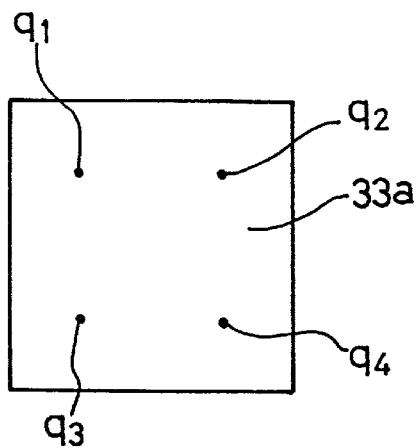
Figure 6B:
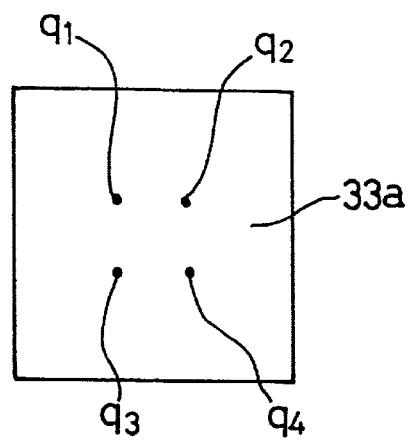
Figure 6C:
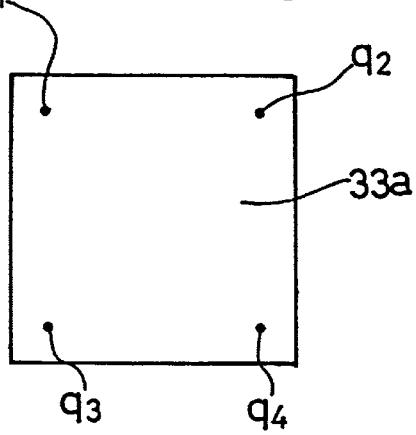
Figure 6D:
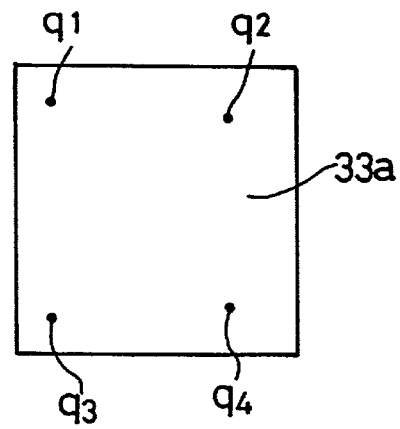

Optical characteristics of the molding resin 15 in the unhardened state (unhardened molded lens) can be measured in the same manner as that using a known lens meter. For example, in the case where the lens molding tool 10 is not set on the set table 26, parallel light rays are projected on the pattern plate 32, passing through four projecting lens 32a of the pattern plate 32, and form four light points q1 to q4 equally separated from the center on a plane 33a of the light receiving element 33, as shown in FIG. 6(a). A square formed by a line connecting the four light points q1 to q4 to each other is taken as a reference. Next, in the case of a convex molded lens to be manufactured, as shown in FIG. 6(b), light points q1 to q4 forming a square with a distance between two light points narrowed are formed on the plane 33a of the light receiving element 33; and in the case of concave molded lens to be manufactured, as shown in FIG. 6(c), light points q1 to q4 forming a square with a distance between two light points widened are formed on the plane 33a of the light receiving element 33. And, in the case of a molded lens containing a prism component, as shown in FIG. 6(d), the shape of a square formed by a line connecting four light points q1 to q4 to each other is distorted. Accordingly, by electrically calculating information of the light points q1 to q4 formed on the plane 33a of the light receiving element 33, a refractivity S, cylindricity C, axial angle A, and prism component Pr can be approximately obtained.

If the measured refractivity S, cylindricity C, axial angle A are quite different from a recipe of a molded lens to be manufactured, it can be judged whether or not the lens forming molds 13 and 14 are erroneously set by examining the above measured values. Alternatively, it may be confirmed whether or not the lens forming molds 13 and 14 set on the set table 26 are accurately matched with a recipe of a molded lens to be manufactured by measuring the radius of curvature of each of the lens forming molds 13 and 14 after setting of the lens forming molds 13 and 14 in the forming frame (gasket) 11 and before injection of the 10 molding resin 15 into the forming frame 11.

If it is confirmed, at the step prior to hardening, that a prism component is contained in the molding resin 15, the lens molding tool 10 is removed from the set table 26 and is set on a working table (not shown), and to remove the prism component, the pressing force of the pressing jigs 17, 18 and 19 is adjusted by turning the thumbscrews 22 for adjusting the inclination of each of the lens forming molds 13 and 14. In this case, it may be desirable that the direction where the prism component is contained be displayed on a monitor (not shown) because it can be immediately confirmed which pressing jig should be adjusted on the basis of the displayed direction where the prism component is contained.

After adjustment of the inclination of each of the lens forming molds 13 and 14, the lens molding tool 1 is set again on the set table 26, and the optical characteristics are again measured. If the optical characteristics are within tolerances respectively, the set table 26 is turned to feed the lens molding tool 10 to the ultraviolet ray irradiation chamber 29.

Figure 7A:
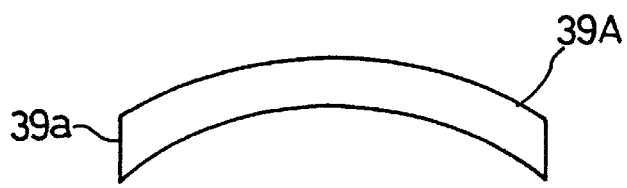
FIG. 7(a) is a view showing a cross-sectional shape of a concave molded lens formed by the lens molding tool.
Figure 7B:
FIG. 7(b) is a view showing a cross-sectional shape of a convex molded lens formed by the lens molding tool.

In the ultraviolet ray irradiation chamber 29 are provided a halogen lamp 36a, a reflection shield 37a, an ultraviolet ray transmissive filter 38a having a large transmittance for light in an ultraviolet ray region. The molding resin 15 is irradiated with ultraviolet rays to be hardened. In this way, a concave molded lens 39A shown in FIG. 7(a) or a convex molded lens 40A shown in FIG. 7(b) is formed.

Figure 8:
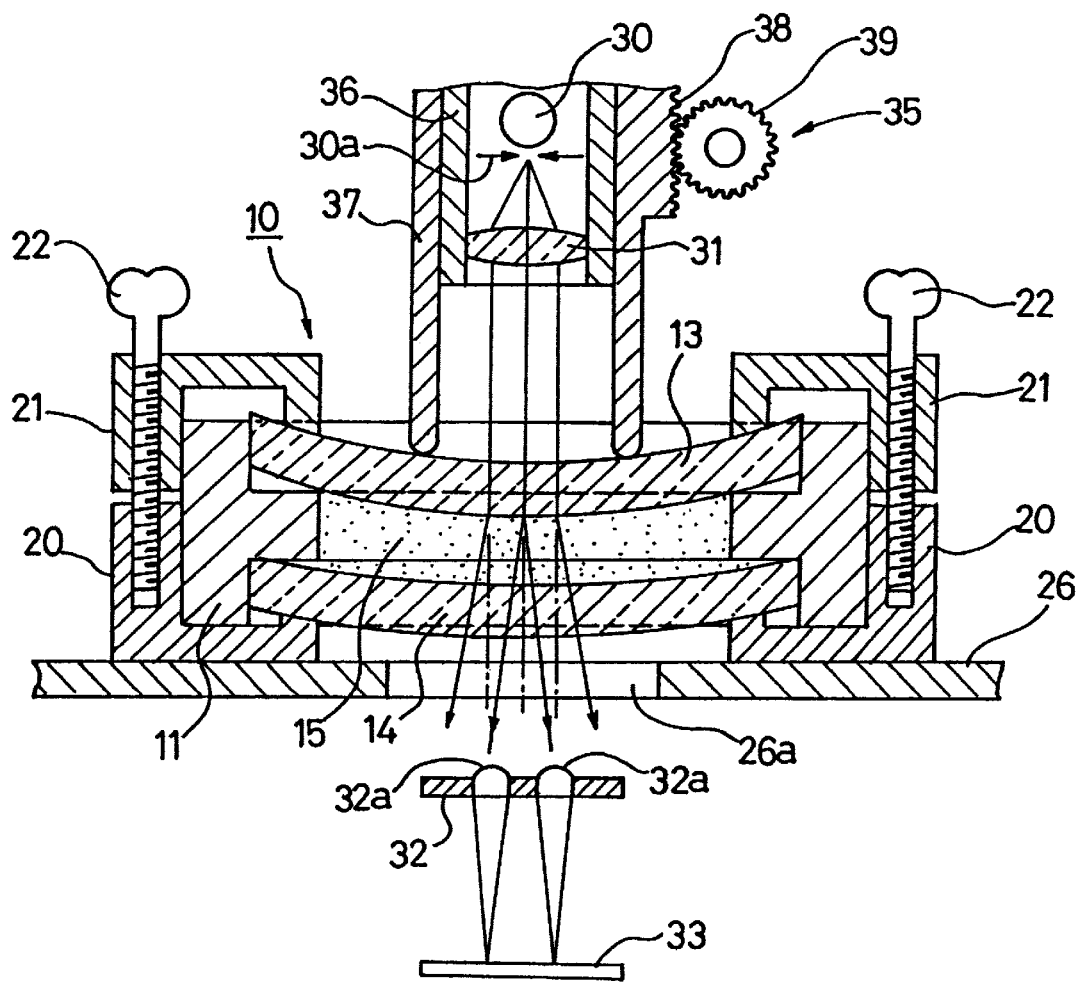
FIG. 8 is a sectional view showing a modification of the lens molding tool according to the present invention.

Each of the pressing jigs 17, 18 and 19 may be configured as shown in FIG. 8.

As shown in FIG. 8, the lower pressing member 20 is provided with an irradiation light source 41 for irradiating a molding resin with detecting light rays for detecting foreign matters such as bubbles or dust contained in the molding resin. The molding resin 15 is irradiated with the detecting light rays emitted from a side of the forming frame 11. If the molding resin 15 contains bubbles or dust, the detecting light rays are irregularly reflected therefrom. Accordingly, by use of the molding tool 10 provided with the irradiation light source 41, it is possible to easily, simply check foreign matters such as bubbles or duct contained in the molding resin visually or through a loupe before the molding tool 10 is set on the lens molding apparatus. In this embodiment, the irradiation light source 41 is provided in the molding tool 1; however, it may be provided in the lens molding. apparatus.

Figure 9:
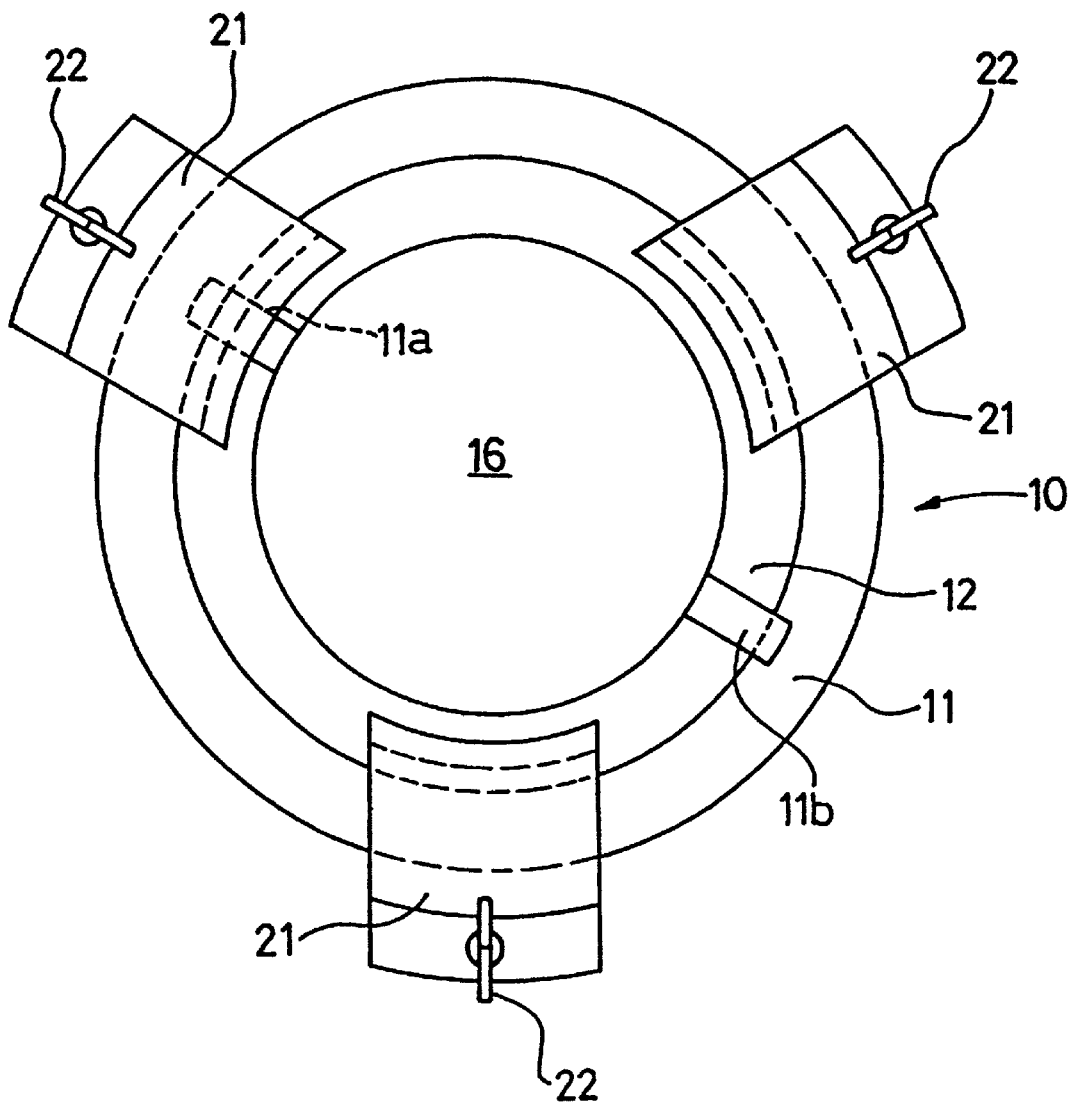
FIG. 9 is a sectional view showing another modification of the lens molding tool according to the present invention.

As shown in FIG. 9, the molding tool 10 may be configured such that a molding resin guiding groove 11a is formed in the inner peripheral portion of the forming frame 11, wherein the molding resin 15 is injected through the molding resin guiding groove 11a. In this case, an air discharge groove 11b may be formed on the side being opposed 180° to the molding resin guiding groove 11a for smoothly discharging air in the target space 16 along with the injection of the molding resin. Also before injection of the molding resin 15 in the target space 16, air may be blasted to the lens forming molds 13 and 14 through the molding resin guiding groove 11a, followed by discharging of the air from the air discharge groove 11b, in order to remove dust and the like adhering on the lens forming molds 13 and 15.

Figure 10:
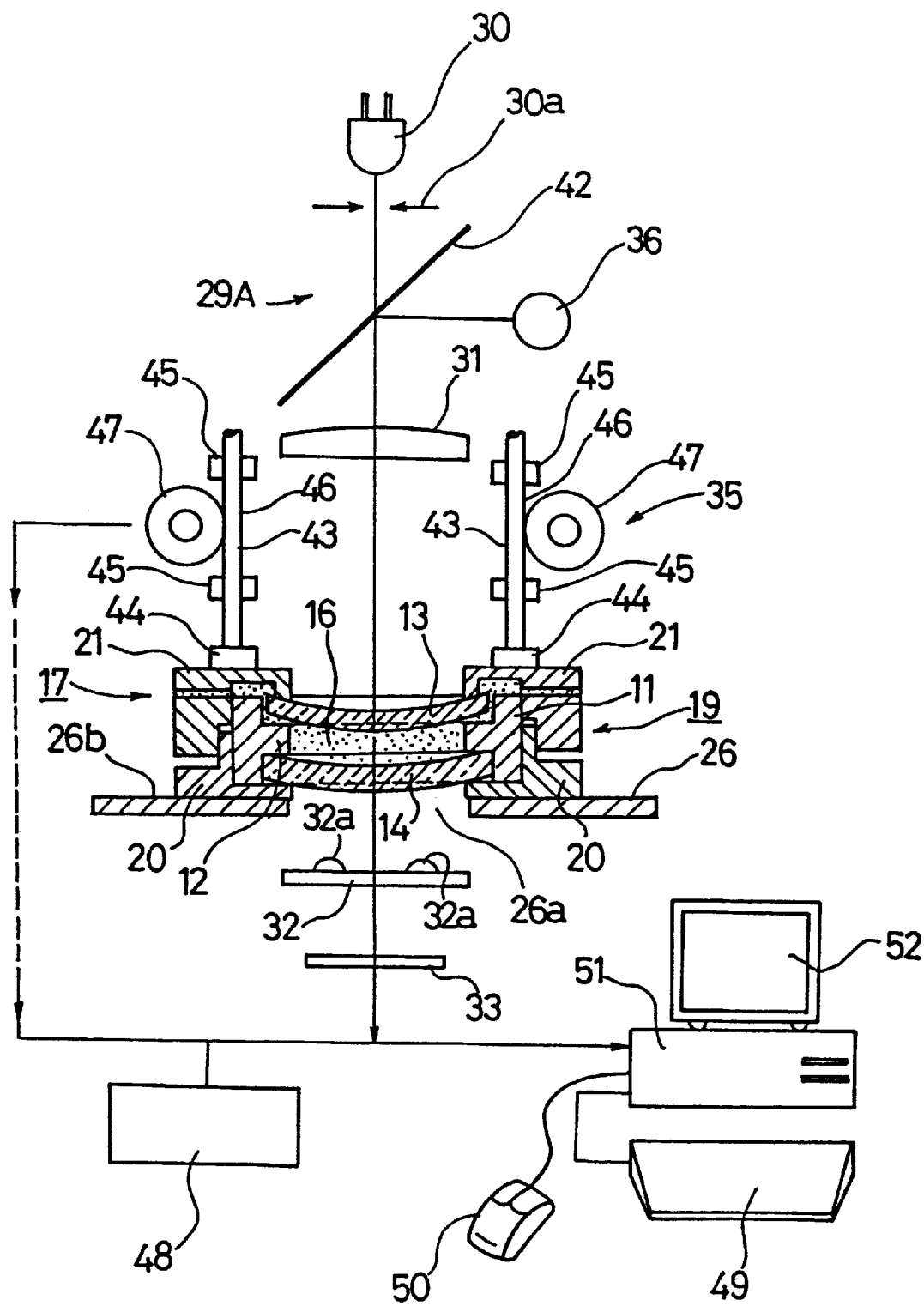
FIG. 10 is a configuration view showing a second embodiment of the lens molding apparatus according to the present invention.

FIG. 10 is a schematic view showing a lens molding apparatus according to a second embodiment of the present invention. In this embodiment, the halogen lamp 36 for emitting ultraviolet rays is assembled in the measuring system 29A. The measuring system 29A is provided with a dichroic mirror 42 which transmits light rays of the measuring light source 30 but which reflects ultraviolet rays. The upper pressing member 21 of each of the pressing jigs 17, 18 and 19 is vertically movable while being guided by the lower pressing member 20. The measuring system 29A is provided with pressing mechanisms 35. The pressing mechanism 35 includes a pressing rod 43 for pressing the upper pressing member 21. A pad 44 is provided at the lower end of the pressing rod 43. The pressing rod 43 is vertically movable while being guided in a guide cylinder 45. A rack 46 is formed on the pressing rod 43 in such a manner as to be movable in the longitudinal direction of the pressing rod 43. To be more specific, the rack 46 meshes with a pinion 47 which is driven by a pulse motor (not shown).

The pressing mechanisms 35 serve as a measuring means for measuring the height of the pressing jigs 17, 18 and 19 (thereby the height of the forming frame 11) by counting the number of pulses of each pulse motor on the basis of an upper surface 26b of the set table 26.

The lens molding apparatus has a memory means 48 for storing the inside diameter and height of the forming frame 11, the thickness of the annular stepped portion 12, and the radius of curvature and center thickness of each of the lens forming molds 13 and 14. When the type number of the forming frame 11 and the type number of each of the forming molds 13 and 14 are inputted by an input means such as a key board 49 and a mouse 50, the above data are supplied to a calculating unit 51. The calculating unit 51 is able to estimate the thickness of an outer edge 39a (40a) of the molded lens 39A (40A) on the basis of the measured results obtained by the measuring means 48 and the stored data including the inside diameter and height of the forming frame 11 and the radius of curvature and center thickness of each of the forming molds 13 and 14. The memory means 48 constitutes the thickness measuring means in co-operation with the input means such as the key board 49 and mouth 50 and the calculating unit 51.

Also, there may be adopted a configuration in which the shape of a frame of a spectacle lens is inputted by the input means for calculating the thickness of an edge of the molded lens 39A (40A) which is assumed to be machined into the shape of the frame of the spectacle lens. This configuration exhibits an effect of allowing selection of the molding frame 11 suitable for preparing a convex lens having a center thickness being as thin as possible while keeping the minimum edge thickness after machining the convex molded lens.

The lens molding apparatus in which the pressing jigs 17, 18 and 19 are pressed by the pressing mechanisms 35, may further adopt a configuration that optical characteristics of an unhardened molded lens are displayed on a monitor 52 during measurement of the optical characteristics, wherein the pressing force of each of the pressing mechanisms 35 is adjusted under visual observation of a prism component displayed on the monitor 52. This configuration is convenient in that the inclination of each of the lens forming molds 13 and 14 to the forming frame 11 can be adjusted in the state in which the molding tool 10 is set on the set table 26.

The lens molding apparatus may be provided with an automatic control means for driving each pulse motor such that the prism value automatically becomes zero. In this case, the measuring system 29A is configured such that the prism value of an unhardened molded lens can be simultaneously measured.

The lens forming frame 11, into which the molding resin has been injected and to which the lens forming molds 13 and 14 have been mounted, is set on the set table 26. Then, each pulse motor is driven by turning on an auto-mode button (not shown), to drive each pressing rod 43 in the direction where the pressing force applied to each of the lens forming molds 13 and 14 is increased. If the pressing force reaches a critical value, an error message is displayed on the monitor 52. However, even when the error message is displayed, if it is recognized that there is no problem resulting from the operator's check for the prism value displayed on the monitor 52, ultraviolet rays may be emitted by turning on an ultraviolet ray irradiation switch (not shown).

Also, there may be adopted the following configuration: namely, if an error message is displayed, each pulse motor is driven by turning on a re-start switch (not shown) to return each pressing rod 43 to the initial position, followed by additional injection of the molding resin 15, and each pulse motor is driven again to drive each pressing rod 43 in the direction where the pressing force applied to each of the lens forming molds 13 and 14 is increased; and when the prism value becomes zero, an instruction "Termination of Pressing" is displayed on the monitor 52, and then the set table 26 is automatically turned, followed by irradiation of the molding resin 15 with ultraviolet rays.

In addition, even if the prism value does not become zero but falls within a substantially allowable range, the process may automatically go on to the ultraviolet rays irradiation step. Also if an allowable prism value is described in a recipe of a molded lens to be manufactured, such a prism value may be inputted and stored in the memory means, and the pressing force may be adjusted such that a difference between the inputted prism value and the measured value falls within an allowable, range.

Further, since a recipe of a molded lens used for the left eye is generally different from that used for the right eye, a check means for checking whether the molded lens is one used for the left eye or one used for the right eye may be assembled in the lens molding apparatus.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A spectacle lens molding apparatus comprising:

a lens molding tool having an annular forming frame with an annular step portion formed on an inner peripheral surface of said forming frame, a pair of lens forming molds opposed to each other with said annular step portion held therebetween to form a molding resin filling space;

a housing having an optical characteristics measuring chamber and an ultraviolet ray irradiation chamber;

a set table being movable so as to first place said lens molding tool in said optical characteristics measuring chamber and then in said ultraviolet ray irradiation chamber;

a measuring system provided in said optical characteristics measuring chamber for measuring optical characteristics of an unhardened molded lens in said molding resin filling space; and an ultraviolet light source provided in said ultraviolet ray irradiation chamber for irradiating said unhardened molded lens with ultraviolet rays to form a hardened molded lens when said unhardened molded lens is sent from said optical characteristics measuring chamber to said ultraviolet ray irradiation chamber.

2. A spectacle lens molding apparatus according to claim 1, wherein said measuring system is configured to measure prism values of at least three points of said unhardened molded lens as one optical characteristic.

3. A spectacle lens molding apparatus according to claim 1, wherein said set table is provided with a positioning portion for positioning said lens molding tool in such a manner that the center of said forming frame substantially aligns with the center of the optical axis of said measuring system.

4. A spectacle lens molding apparatus according to claim 1, wherein said measuring system includes a pressing mechanism for pressing at least one of said pair of lens forming molds.

5. A spectacle lens molding apparatus according to claim 4, wherein said pressing mechanism is capable of adjusting the inclination of said lens forming molds.

6. A spectacle lens molding apparatus according to claim 1, further comprising a thickness measuring means to indirectly measure the thickness of said unhardened molded lens.

7. A spectacle lens molding apparatus according to claim 6, wherein said thickness measuring means is provided with a memory means for storing the inner diameter and height of said forming frame, the thickness of said annular stepped portion, and the radius of curvature and center thickness of said forming molds; and a pressing mechanism is provided with a measuring means for measuring the height of said forming frame from a reference position;

wherein said thickness measuring means is capable of estimating the thickness of outer edge of said unhardened molded lens on the basis of the measured results obtained by said measuring means and the stored data including the inner diameter and height of said forming frame, the thickness of said annular stepped portion, and the radius of curvature and center thickness of said forming molds.

8. A spectacle lens molding apparatus according to claim 7, further comprising an input means for inputting information on the shape of a frame of a spectacle lens, wherein said thickness measuring means is capable of estimating the thickness of the edge of said unhardened molded lens which is assumed to be machined into the shape of the frame of the spectacle lens on the basis of input data including the information on the shape of the frame of the spectacle lens and stored data including the inner diameter and height of said forming frame, the thickness of said annular stepped portion, and the radius of curvature and center height of each of said forming molds.

* * * * *